(12) United States Patent
Yubuchi et al.

(10) Patent No.: US 12,537,194 B2
(45) Date of Patent: Jan. 27, 2026

(54) POSITIVE ELECTRODE ACTIVE MATERIAL FOR LITHIUM-ION BATTERY, PRODUCTION METHOD THEREFOR, AND LITHIUM-ION BATTERY

(71) Applicants: TOYOTA JIDOSHA KABUSHIKI KAISHA, Toyota (JP); NATIONAL UNIVERSITY CORPORATION YOKOHAMA NATIONAL UNIVERSITY, Yokohama (JP)

(72) Inventors: So Yubuchi, Shizuoka-ken (JP); Jun Yoshida, Mishima (JP); Naoaki Yabuuchi, Yokohama (JP)

(73) Assignees: TOYOTA JIDOSHA KABUSHIKI KAISHA, Toyota (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 581 days.

(21) Appl. No.: 17/978,268

(22) Filed: Nov. 1, 2022

(65) Prior Publication Data
US 2023/0137455 A1 May 4, 2023

(30) Foreign Application Priority Data
Nov. 2, 2021 (JP) .................. 2021-179747

(51) Int. Cl.
*H01M 4/485* (2010.01)
*H01M 10/0525* (2010.01)
*H01M 4/02* (2006.01)

(52) U.S. Cl.
CPC ....... *H01M 4/485* (2013.01); *H01M 10/0525* (2013.01); *H01M 2004/028* (2013.01)

(58) Field of Classification Search
CPC .................................................. H01M 4/485
See application file for complete search history.

(56) References Cited

U.S. PATENT DOCUMENTS

2019/0088940 A1* 3/2019 Ceder .................. H01M 4/525

FOREIGN PATENT DOCUMENTS

| CN | 107925080 A | 4/2018 |
| JP | 2018-535904 A | 12/2018 |
| JP | 2019-091580 A | 6/2019 |

OTHER PUBLICATIONS

JP2019091580A Translation from Espacenet (Year: 2019).*
Lianqi Zhang et al., "Synthesis and electrochemistry of new layered (1-x) LiVO$_2$•xLi$_2$TiO$_3$ (0≤x≤0.6) electrode materials", Journal of Power Resources, 2007, vol. 174, pp. 1007-1011 (5 pages total).

* cited by examiner

*Primary Examiner* — Nathanael T Zemui
(74) *Attorney, Agent, or Firm* — Sughrue Mion, PLLC

(57) ABSTRACT

Disclosed is a positive electrode active material for a lithium-ion battery, wherein the positive electrode active material has small volume changes during charging and discharging, and when applied to a battery, can improve the cycle characteristics of the battery. The positive electrode active material of the present disclosure has a disordered rock salt structure belonging to space group Fm-3m, and has a composition represented by $Li_{1+x}Ti_yV_zO_2$ (where $0 < x \leq 0.20$, $0 < y \leq 0.40$, and $0.40 \leq z \leq 0.85$).

1 Claim, 3 Drawing Sheets

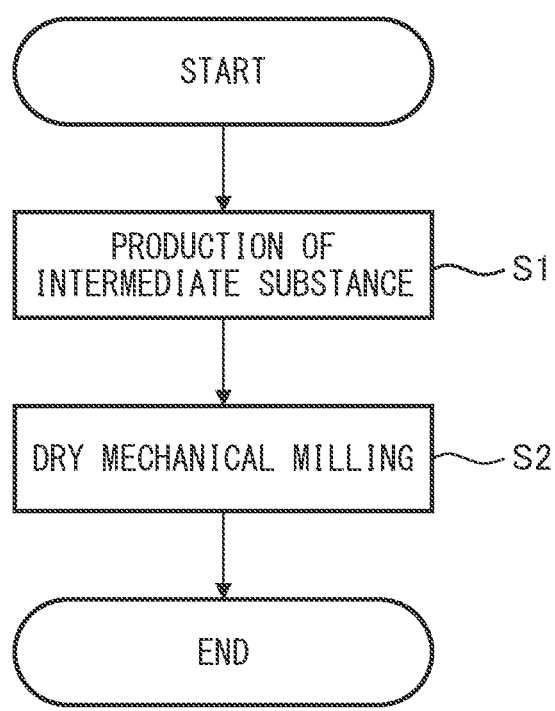
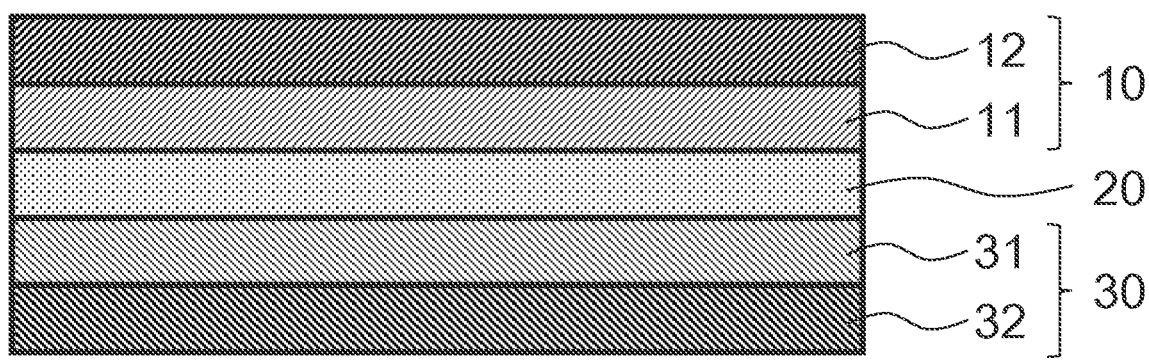

POSITIVE ELECTRODE ACTIVE MATERIAL FOR LITHIUM-ION BATTERY, PRODUCTION METHOD THEREFOR, AND LITHIUM-ION BATTERY

FIELD

The present disclosure relates to a positive electrode active material for a lithium-ion battery, a production method therefor, and a lithium-ion battery.

BACKGROUND

Patent Literature 1 discloses a positive electrode active material for a lithium-ion battery having a layered rock salt structure belonging to space group R-3m, and having a composition represented by $Li_{1+x}Ti_yV_zD_aO_2$ (where D is a doping element, $0 \leq x<1$, $0<y<0.5$, $0.3 \leq z<1$, and $0 \leq a \leq 0.2$). Furthermore, Non-Patent Literature 1 discloses an electrode active material having a layered rock salt structure and having a composition represented by $(1-x)LiVO_2 \cdot xLi_2TiO_3$ (where $0 \leq x \leq 0.6$).

CITATION LIST

Patent Literature

[PTL 1] JP 2019-091580 A

Non-Patent Literature

[NPL 1] Journal of Power Sources, 174, 2007, pp. 1007-1011

SUMMARY

Technical Problem

According to the findings of the present inventors, positive electrode active materials having a rock salt structure have significant volume changes during charging and discharging. When applied to a lithium-ion battery, this can be a factor in deteriorating the cycle characteristics of the battery.

Solution to Problem

As one means for solving the problem described above, the present disclosure provides:
a positive electrode active material for a lithium-ion battery,
having a disordered rock salt structure belonging to space group Fm-3m, and
having a composition represented by $Li_{1+x}Ti_yV_zO_2$ (where $0<x \leq 0.20$, $0<y \leq 0.40$, and $0.40 \leq z \leq 0.85$).

As one means for solving the problem described above, the present disclosure provides:
a lithium-ion battery comprising the positive electrode active material of the present disclosure.

The positive electrode active material for a lithium-ion battery of the present disclosure can be produced by, for example, the following method. Specifically, the production method of the present disclosure may comprise the steps of:
producing an intermediate substance having a layered rock salt structure and having a composition represented by $Li_{1+x}Ti_yV_zO_2$ (where $0<x \leq 0.20$, $0<y \leq 0.40$, and $0.40 \leq z \leq 0.85$), and
subjecting the intermediate substance to dry mechanical milling to obtain a positive electrode active material having a disordered rock salt structure belonging to space group Fm-3m, and having a composition represented by $Li_{1+x}Ti_yV_zO_2$ (where $0<x \leq 0.20$, $0<y \leq 0.40$, and $0.40 \leq z \leq 0.85$).

Effects

The positive electrode active material of the present disclosure has small volume changes during charging and discharging. By applying such a positive electrode active material to a lithium-ion battery, the cycle characteristics of the battery can easily be improved.

BRIEF DESCRIPTION OF DRAWINGS

FIG. 1 shows an example of a method for producing a positive electrode active material for a lithium-ion battery.

FIG. 2 schematically shows an example of the structure of a positive electrode and a lithium-ion battery.

DESCRIPTION OF EMBODIMENTS

Figure 3:
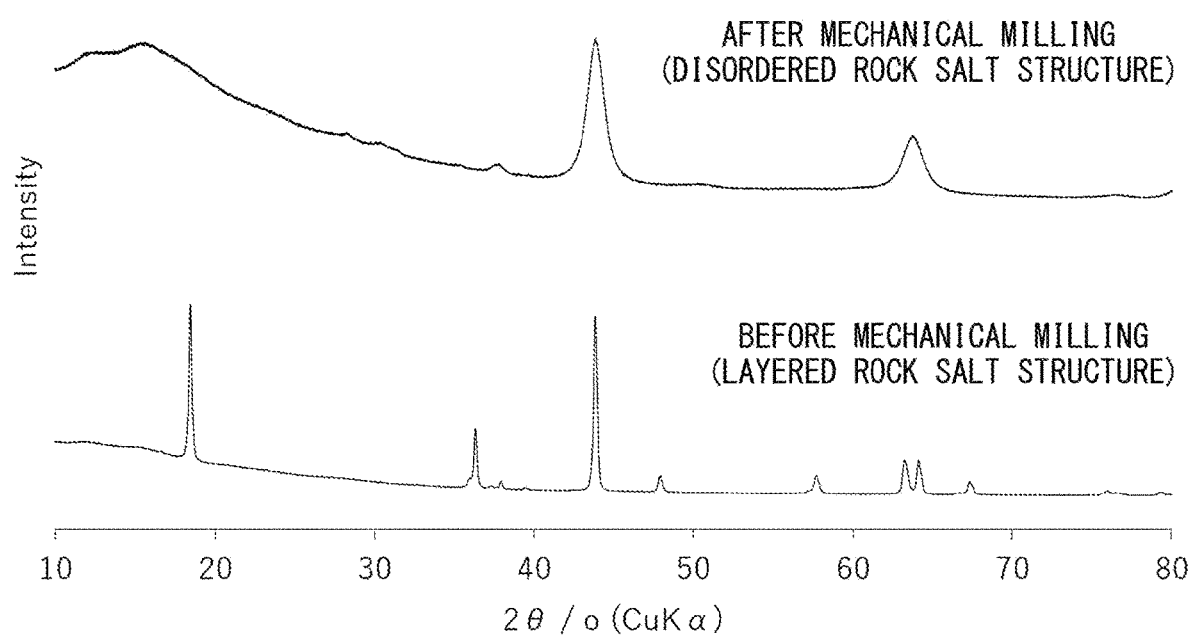
FIG. 3 is a comparison of the X-ray diffraction peaks of an intermediate substance before dry mechanical milling and a positive electrode active material after dry mechanical milling.

1. Positive Electrode Active Material for a Lithium-Ion Battery

The positive electrode active material for a lithium-ion battery of the present disclosure has a disordered rock salt structure belonging to space group Fm-3m, and has a composition represented by $Li_{1+x}Ti_yV_zO_2$ (where $0<x \leq 0.20$, $0<y \leq 0.40$, and $0.40 \leq z \leq 0.85$).

1.1 Crystal Structure

Regarding conventionally known positive electrode active materials having a layered rock salt structure, reversible transition metal migration during charging and discharging processes is difficult, and the volume tends to expand or contract greatly in one dimension along with the insertion or desorption of Li. Conversely, the positive electrode active material of the present disclosure has a disordered rock salt structure belonging to space group Fm-3m. According to such a positive electrode active material, volume changes are easily suppressed due to the movement of V. For example, a volume change, if any, is likely to be isotropic expansion and contraction, and a one-dimensional volume change is unlikely to occur. In the positive electrode active material of the present disclosure, change in the lattice constant of the crystal structure during charging and discharging is suppressed to, for example, 1% or less. Thus, by applying the positive electrode active material, which has small volume change due to charging and discharging, to a lithium-ion battery, the cycle characteristics of the battery can easily be improved.

1.2 Composition

The positive electrode active material of the present disclosure has the composition represented by $Li_{1+x}Ti_yV_zO_2$. Here, the relationships $0<x \leq 0.20$, $0<y \leq 0.40$, and $0.40 \leq z \leq 0.85$ are satisfied. When such a composition is provided, the disordered rock salt structure described above is easily maintained, and the effects described above are easily exhibited. Furthermore, when such a composition is provided, high charge-discharge capacity can easily be obtained.

x is greater than 0, and may be 0.01 or more, 0.02 or more, 0.03 or more, 0.04 or more, 0.05 or more, 0.06 or more, 0.07 or more, 0.08 or more, 0.09 or more, 0.10 or more, or 0.11 or more. Furthermore, x is 0.20 or less, and may be 0.19 or less, 0.18 or less, 0.17 or less, 0.16 or less, 0.15 or less, or 0.14 or less.

y is greater than 0, and may be 0.01 or more, 0.03 or more, 0.05 or more, 0.07 or more, 0.09 or more, 0.10 or more, 0.11 or more, 0.13 or more, 0.15 or more, 0.17 or more, 0.19 or more, 0.21 or more, or 0.22 or more. Furthermore, y is 0.40 or less, and may be 0.39 or less, 0.38 or less, 0.37 or less, 0.36 or less, 0.35 or less, 0.34 or less, 0.33 or less, 0.32 or less, 0.31 or less, 0.30 or less, or 0.29 or less.

z is 0.40 or more, and may be 0.42 or more, 0.44 or more, 0.46 or more, 0.48 or more, 0.50 or more, 0.52 or more, 0.54 or more, 0.56 or more, or 0.57 or more. Furthermore, z is 0.85 or less, and may be 0.83 or less, 0.81 or less, 0.79 or less, 0.77 or less, 0.75 or less, 0.73 or less, 0.71 or less, 0.69 or less, or 0.67 or less.

1.3 Others

The positive electrode active material of the present disclosure is only required to have the crystal structure and composition described above and is not particularly limited by the other constituent features.

1.3.1 Shape

Regarding the shape of the positive electrode active material, an appropriate shape such as particulate or thin film may be selected in accordance with the shape of the battery. When the positive electrode active material is particulate, the particles may be solid particles or hollow particles. The particles of the positive electrode active material may be primary particles or secondary particles in which a plurality of primary particles are aggregated. The average particle diameter (D50) of the particles of the positive electrode active material may be, for example, 1 nm or more, 5 nm or more, or 10 nm or more, and may be 500 μm or less, 100 μm or less, 50 μm or less, or 30 μm or less. The average particle diameter D50 referred to herein is the particle diameter (median diameter) at the integrated value of 50% in a volume-based particle size distribution determined by the laser diffraction/scattering method.

1.3.2 Protective Layer

A protective layer containing a Li-ion conductive oxide may be formed on the surface of the positive electrode active material of the present disclosure. As a result, reactions between the positive electrode active material and a sulfide (for example, a sulfide solid electrolyte, which is described later) can easily be suppressed. Examples of the Li-ion conductive oxide include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. An element of the Li-ion conductive oxide may be partially substituted with a doping element such as P or B. The coverage (area ratio) of the protective layer may be, for example, 70% or more, 80% or more, or 90% or more. The thickness of the protective layer may be, for example, 0.1 nm or more, or 1 nm or more, and may be 100 nm or less, or 20 nm or less.

2. Method for Production of Positive Electrode Active Material for Lithium-Ion Battery The positive electrode active material of the present disclosure can be produced by, for example, the following method. As shown in FIG. 1, the production method according to an embodiment may comprise:

step S1: producing an intermediate substance having a layered rock salt structure and having a composition represented by $Li_{1+x}Ti_yV_zO_2$ (where $0<x≤0.20$, $0<y≤0.40$, and $0.40≤z≤0.85$), and step S2: subjecting the intermediate substance to dry mechanical milling to obtain a positive electrode active material having a disordered rock salt structure belonging to space group Fm-3m, and having a composition represented by $Li_{1+x}Ti_yV_zO_2$ (where $0<x≤0.20$, $0<y≤0.40$, and $0.40≤z≤0.85$).

2.1 Step S1

In step S1, an intermediate substance having a layered rock salt structure (belonging to space group R-3m) and having a composition represented by $Li_{1+x}Ti_yV_zO_2$ (where $0<x≤0.20$, $0<y≤0.40$, and $0.40≤z≤0.85$) is produced. The intermediate substance can be produced by, for example, firing (calcining, baking, sintering) a mixture of a Li source, a Ti source, and a V source, after optionally molding the mixture.

2.1.1 Raw Materials

Examples of the Li source constituting the mixture include $Li_2CO_3$. Examples of the Ti source include $TiO_2$. Further, examples of the V source include $V_2O_3$. By adopting $Li_2CO_3$, $TiO_2$, and $V_2O_3$ as the Li source, the Ti source, and the V source, respectively, the desired layered rock salt structure is easily formed in the intermediate substance, and the desired disordered rock salt structure is easily formed in the ultimate positive electrode active material. Alternatively, raw materials other than the those described above may be used as the raw materials constituting the mixture, and further, a compound (such as a composite oxide) which serves as at least two of the Li source, the Ti source, and the V source may be used. The composition ratio of Li, Ti, and V contained in the mixture can be appropriately determined in accordance with the composition ratio of the ultimate positive electrode active material. The mixture may be adjusted so that Li is included in excess. As a result, even if Li is volatilized during the firing in step S1, or if Li is consumed by a side reaction in step S2, which will be described later, the Li shortfall can be compensated for. That is, the desired composition is easily obtained in the ultimate positive electrode active material.

2.1.2 Mixing Means

The method for mixing the Li source, the Ti source, and the V source is not particularly limited. The Li source, the Ti source, and the V source can be uniformly mixed by wet mechanical milling using a solvent. For example, an organic solvent such as ethanol may be used as the solvent. The wet mechanical milling can be performed by mechanical mixing means such as, for example, a planetary ball mill. The mixing conditions (mixing time, rotation speed, number of repetitions, etc.) of the wet mechanical milling are not particularly limited, and the conditions may be such that the Li source, the Ti source, and the V source are uniformly mixed to the extent that the desired layered rock salt structure can be formed after firing, which is described later.

2.1.3 Molding

The mixture described above may be molded into pellets prior to firing. The sizes and shapes of the molded bodies are not particularly limited.

2.1.4 Firing

By firing the mixture or molded bodies described above, an intermediate substance having a layered rock salt structure and the composition described above is obtained. The firing atmosphere is not particularly limited, and may be, for example, an oxygen-containing atmosphere such as the ambient atmosphere or an air atmosphere, or an inert gas atmosphere such as an Ar atmosphere. Particularly when it is an inert gas atmosphere, the desired intermediate substance can easily be obtained. The firing temperature is not particularly limited as long as a layered rock salt structure can be obtained. For example, it may be 800° C. or higher, or 850° C. or higher, and may be 1000° C. or lower, or 950° C. or lower. The firing time (retention time at the firing temperature) is not particularly limited either, and may be, for example, 5 hours or more, 7 hours or more, 10 hours or more, or 12 hours or more, and may be 100 hours or less, 50 hours or less, or 20 hours or less.

2.2 Step S2

In step S2, by subjecting the intermediate substance described above to dry mechanical milling, a positive electrode active material having a disordered rock salt structure belonging to space group Fm-3m, and having a composition represented by $Li_{1+x}Ti_yV_zO_2$ (where $0<x\leq0.20$, $0<y\leq0.40$, and $0.40\leq z\leq0.85$) is obtained. Specifically, by subjecting the intermediate substance described above to dry mechanical milling, in which a solvent is not substantially used, the layered rock salt structure of the intermediate substance is changed, whereby a positive electrode active material having a disordered rock salt structure is obtained. Dry mechanical milling can be performed by mechanical mixing means such as, for example, a planetary ball mill. The dry mechanical milling conditions (mixing time, rotation speed, number of repetitions, etc.) are not particularly limited. For example, when using a planetary ball mill, the rotation speed may be 500 to 700 rpm, the rotation time may be 10 to 20 minutes, and the rest time may be 1 to 5 minutes. The rotation and the rest may be repeated multiple times. Further, a set of rotation and rest may be repeated multiple times. By adjusting the dry mechanical milling conditions, for example, the crystallite size of the positive electrode active material can be controlled.

2.3 Supplement

Note that in the production method of the present disclosure from the mixture through the intermediate substance to the positive electrode active material, the composition ratio of Li, Ti, and V may vary or may be substantially the same without variation. Furthermore, though the intermediate substance having a layered rock salt structure is produced by a solid phase reaction method in the explanation above, the intermediate substance production method is not limited thereto. Furthermore, though the intermediate substance having a layered rock salt structure is subjected to dry mechanical milling in the above explanation, there is room for the adoption of other methods for obtaining the positive electrode active material having a disordered rock salt structure. However, as far as the present inventors have confirmed, after producing an intermediate substance having a layered rock salt structure, by subjecting the intermediate substance to dry mechanical milling, the target disordered rock salt structure can be obtained more stably and easily.

3. Positive Electrode for Lithium-Ion Battery

The technology of the present disclosure also has an aspect as a positive electrode for a lithium-ion battery. Specifically, the positive electrode of the present disclosure comprises the positive electrode active material described above. As shown in FIG. 2, the positive electrode 10 according to an embodiment may comprise a positive electrode active material layer 11 and a positive electrode current collector 12, and in this case, the positive electrode active material layer 11 may comprise the positive electrode active material described above.

3.1 Positive Electrode Active Material Layer

The positive electrode active material layer 11 comprises at least the positive electrode active material described above, and may optionally comprise an electrolyte, a conductive agent, and a binder. The content of each of the positive electrode active material, the electrolyte, the conductive agent, and the binder in the positive electrode active material layer 11 may be appropriately determined in accordance with the target battery performance. For example, when the entire positive electrode active material layer 11 (total solid content) is 100% by mass, the content of the positive electrode active material may be 40% by mass or more, 50% by mass or more, or 60% by mass or more, and may be 100% by mass or less, or 90% by mass or less. The shape of the positive electrode active material layer 11 is not particularly limited, and may be, for example, a sheet-like positive electrode active material layer 11 having a substantially flat surface. The thickness of the positive electrode active material layer 11 is not particularly limited, and may be, for example, 0.1 μm or more, or 1 μm or more, and may be 2 mm or less, or 1 mm or less.

3.1.1 Positive Electrode Active Material

The positive electrode active material layer 11 may comprise only the positive electrode active material having a disordered rock salt structure described above as the positive electrode active material. Alternatively, the positive electrode active material layer 11 may comprises a different type of positive electrode active material (another positive electrode active material) in addition to the positive electrode active material described above. From the viewpoint of further enhancing the effect of the technology of the present disclosure, the content of other positive electrode active material in the positive electrode active material layer 11 may be small. For example, the positive electrode active material having a disordered rock salt structure described above may occupy 50% by mass or more, 60% by mass or more, 70% by mass or more, 80% by mass or more, 90% by mass or more, 95% by mass or more, or 99% by mass or more of the total positive electrode active material contained in the positive electrode active material layer 11.

3.1.2 Electrolyte

The electrolyte may be a solid electrolyte, or may be a liquid electrolyte (electrolytic solution). When the positive electrode 10 is a positive electrode for a solid-state battery (a battery containing a solid electrolyte), the positive electrode active material layer 11 may comprise a solid electrolyte as the electrolyte. Furthermore, when the positive electrode 10 is a positive electrode for a liquid electrolyte battery, the positive electrode active material layer 11 may contain an electrolytic solution as an electrolyte, or the positive electrode active material layer 11 is in contact with an electrolytic solution. When the positive electrode 10 is a positive electrode for a liquid electrolyte battery, it is sufficient that the positive electrode active material layer 11 and the electrolytic solution be in contact at least after the battery is constructed. The same is true for the negative electrode 30, which will be described later.

The solid electrolyte may be any known solid electrolyte for batteries. The solid electrolyte may be an inorganic solid electrolyte or an organic polymer electrolyte. In particular, inorganic solid electrolytes have higher ionic conductivity than organic polymer electrolytes. Furthermore, inorganic solid electrolytes have excellent heat resistance as compared with organic polymer electrolytes. As the inorganic solid electrolyte, for example, oxide solid electrolytes such as lithium lanthanum zirconate, LiPON, $Li_{1+x}Al_xGe_{2-x}(PO_4)_3$, Li—SiO-based glasses, and Li—Al—S—O-based glasses;

and sulfide solid electrolytes such as $Li_2S$—$P_2S_5$, $Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$ can be exemplified. In particular, sulfide solid solid electrolytes, and thereamong, sulfide solid electrolytes containing $Li_2S$—$P_2S_5$, have high performance. The solid electrolyte may be amorphous or crystalline. The solid electrolyte may be, for example, particulate. Only one type of solid electrolyte may be used alone, or two or more types may be used in combination.

The electrolytic solution may contain, for example, lithium ions as carrier ions. The electrolytic solution may be an aqueous electrolytic solution or a non-aqueous electrolytic solution. The composition of the electrolytic solution may be the same as that of the composition of known lithium-ion battery electrolytic solutions. For example, as the electrolytic solution, a solution obtained by dissolving a lithium salt at a predetermined concentration in a carbonate-based solvent can be used. Examples of the carbonate-based solvent include fluoroethylene carbonate (FEC), ethylene carbonate (EC), and dimethyl carbonate (DMC). Examples of the lithium salt include $LiPF_6$.

3.1.3 Conductive Agent

Examples of the conductive agent include carbon materials such as vapor grown carbon fiber (VGCF), acetylene black (AB), Ketjen black (KB), carbon nanotubes (CNT), and carbon nanofibers (CNF); and metal materials such as nickel, aluminum, and stainless steel. The conductive agent may be, for example, particulate or fibrous, and the size thereof is not particularly limited. One type of conductive agent may be used alone, or two or more types may be used in combination.

3.1.4 Binder

Examples of the binder include butadiene rubber (BR) based binder, butylene rubber (IIR) based binder, acrylate butadiene rubber (ABR) based binder, styrene-butadiene rubber (SBR) based binder, polyvinylidene fluoride (PVdF) based binder, polytetrafluoroethylene (PTFE) based binder, and polyimide (PI) based binder. Only one type of binder may be used alone, or two or more types may be used in combination.

3.2 Positive Electrode Current Collector

As shown in FIG. 2, the positive electrode 10 may comprise a positive electrode current collector 12 which is in contact with the positive electrode active material layer 11 described above. Any general positive electrode current collector for batteries can be used as the positive electrode current collector 12. Furthermore, the positive electrode current collector 12 may be in the form of a foil, plate, mesh, punched metal, or foam. The positive electrode current collector 12 may be composed of a metal foil or a metal mesh. In particular, metal foil is excellent in handleability. The positive electrode current collector 12 may be composed of a plurality of sheets of foil. Examples of the metal constituting the positive electrode current collector 12 include Cu, Ni, Cr, Au, Pt, Ag, Al, Fe, Ti, Zn, Co, and stainless steel. In particular, from the viewpoint of ensuring oxidation resistance, the positive electrode current collector 12 may contain Al. The positive electrode current collector 12 may have some type of coating layer on the surface thereof for the purpose of, for example, adjusting resistance. Furthermore, the positive electrode current collector 12 may be a metal foil or a base material plated or vapor-deposited with the metal described above. When the positive electrode current collector 12 is composed of a plurality of metal foils, it may have some type of layer between the plurality of metal foils. The thickness of the positive electrode current collector 12 is not particularly limited. For example, it may be 0.1 µm or more, or 1 µm or more, and may be 1 mm or less, or 100 µm or less.

3.3 Others

In addition to the constituents described above, the positive electrode 10 may have any of constituents which are conventional for positive electrodes for batteries. Examples thereof include tabs and terminals. The positive electrode 10 can be produced by a known method except that the positive electrode active material having the disordered rock salt structure described above is used. For example, the positive electrode active material layer 11 can be easily molded by dry or wet molding of a positive electrode mixture containing the various components described above. The positive electrode active material layer 11 may be molded together with the positive electrode current collector 12 or may be molded separately from the positive electrode current collector 12.

4. Lithium-Ion Battery

The technology of the present disclosure also includes an aspect as a lithium-ion battery. Specifically, the lithium-ion battery of the present disclosure comprises the positive electrode active material of the present disclosure. As described above, the positive electrode active material of the present disclosure has small volume changes during charging and discharging, and thus, when applied to a lithium-ion battery, the cycle characteristics of the battery can easily be improved. The constituents of the lithium-ion battery of the present disclosure are not particularly limited as long as the positive electrode active material of the present disclosure is contained. For example, as shown in FIG. 2, a lithium-ion battery 100 according to an embodiment may comprise a positive electrode 10, an electrolyte layer 20, and a negative electrode 30. The positive electrode 10 is as described above.

4.1 Electrolyte Layer

The electrolyte layer 20 comprises at least an electrolyte. When the lithium-ion battery 100 is a solid-state battery, the electrolyte layer 20 comprises a solid electrolyte and optionally a binder. In this case, the contents of the solid electrolyte and the binder of the electrolyte layer 20 are not particularly limited. On the other hand, when the lithium-ion battery 100 is a liquid electrolyte battery, the electrolyte layer 20 may contain an electrolytic solution, and it may comprise a separator for containing an electrolytic solution and preventing contact between the positive electrode active material layer 11 and the negative electrode active material layer 31. The thickness of the electrolyte layer 20 is not particularly limited, and may be, for example, 0.1 µm or more, or 1 µm or more, and may be 2 mm or less or 1 mm or less.

The solid electrolyte, the electrolytic solution, and the binder are as described above. The separator may be a separator which is commonly used in lithium-ion batteries, and examples thereof include the one composed of a resin such as polyethylene (PE), polypropylene (PP), polyester, or polyamide. The separator may have a single-layer structure or a multi-layer structure. Examples of the separator having a multilayer structure include a separator having a two-layer PE/PP structure and a separator having a three-layer PP/PE/PP or PE/PP/PE structure. The separator may be composed of a nonwoven fabric such as a cellulose nonwoven fabric, a resin nonwoven fabric, or a glass fiber nonwoven fabric.

4.2 Negative Electrode

As shown in FIG. 2, the negative electrode 30 may comprise a negative electrode active material layer 31 and a negative electrode current collector 32.

4.2.1 Negative Electrode Active Material Layer

The negative electrode active material layer 31 contains at least a negative electrode active material, and may optionally contain an electrolyte, a conductive agent, and a binder. The content of each of the negative electrode active material, the electrolyte, the conductive agent, and the binder in the negative electrode active material layer 31 may be appropriately determined according to the desired battery performance. For example, when the entire negative electrode active material layer 31 (total solid content) is 100% by mass, the content of the negative electrode active material may be 40% by mass or more, 50% by mass or more, or 60% by mass or more, and may be 100% by mass or less or 90% by mass or less. The shape of the negative electrode active material layer 31 is not particularly limited, and may be, for example, a sheet-like negative electrode active material layer having a substantially flat surface. The thickness of the negative electrode active material layer 31 is not particularly limited, and may be, for example, 0.1 μm or more, or 1 μm or more, and may be 2 mm or less or 1 mm or less.

Various substances having a lower potential (charge/discharge potential) at which lithium ions are inserted or desorbed than the positive electrode active material described above can be used as the negative electrode active material. For example, silicon-based active materials such as Si, Si alloys, and silicon oxide; carbon-based active materials such as graphite and hard carbon; various oxide-based active materials such as lithium titanate; and metallic lithium and lithium alloys can be used. Only one type of the negative electrode active material may be used alone, or two or more types may be used in combination.

The shape of the negative electrode active material may be a conventional shape as a negative electrode active material for batteries. For example, the negative electrode active material may be particulate. The negative electrode active material particles may be primary particles or secondary particles in which a plurality of primary particles are aggregated. The average particle diameter (D50) of the negative electrode active material particles may be, for example, 1 nm or more, 5 nm or more, or 10 nm or more, and may be 500 μm or less, 100 μm or less, 50 μm or less, or 30 μm or less. Alternatively, the negative electrode active material may be in the form of a sheet (foil, film) such as metallic lithium foil. That is, the negative electrode active material layer 31 may be composed of a negative electrode active material sheet.

Examples of the electrolyte which can be included in the negative electrode active material layer 31 include the solid electrolytes and electrolytic solutions described above. Examples of the conductive agent which can be included in the negative electrode active material layer 31 include the carbon materials and the metal materials described above. The binder which can be included in the negative electrode active material layer 31 may be appropriately selected from, for example, those exemplified as binders which can be included in the positive electrode active material layer 11 described above.

4.2.2 Negative Electrode Current Collector

As shown in FIG. 2, the negative electrode 30 may comprise a negative electrode current collector 32 which is in contact with the negative electrode active material layer 31 described above. Any conventional negative electrode current collector for batteries can be used as the negative electrode current collector 32. Furthermore, the negative electrode current collector 32 may be in the form of a foil, plate, mesh, punched metal, or foam. The negative electrode current collector 32 may be a metal foil or a metal mesh, or may be a carbon sheet. In particular, metal foil is excellent in handleability. The negative electrode current collector 32 may be composed of a plurality of foils or sheets. Examples of the metal constituting the negative electrode current collector 32 include Cu, Ni, Cr, Au, Pt, Ag, Al, Fe, Ti, Zn, Co, and stainless steel. In particular, the negative electrode current collector 32 may comprise at least one metal selected from Cu, Ni, and stainless steel from the viewpoint of ensuring reduction resistance and preventing alloying with lithium. The negative electrode current collector 32 may have some type of coating layer on the surface thereof for the purpose of, for example, adjusting resistance. Furthermore, the negative electrode current collector 32 may be a metal foil or a base material plated or vapor-deposited with the metal described above. When the negative electrode current collector 32 is composed of a plurality of metal foils, it may have some type of layer between the plurality of metal foils. The thickness of the negative electrode current collector 32 is not particularly limited. For example, it may be 0.1 μm or more, or 1 μm or more, and may be 1 mm or less, or 100 μm or less. In addition to the constituents described above, the negative electrode 30 may have any constituents which are conventional as a negative electrode for batteries. Examples thereof include tabs and terminals.

4.3 Others

The lithium-ion battery 100 may comprise each of the constituents described above housed inside an exterior body. As the exterior body, any known exterior body for batteries can be used. A plurality of batteries 100 may be electrically connected and stacked to form an assembled battery. In this case, the assembled battery may be housed inside a known battery case. The lithium-ion battery 100 may also have obvious constituents such as necessary terminals. Examples of the shape of the lithium-ion battery 100 include a coin shape, a laminate shape, a cylindrical shape, and a rectangular shape.

5. Lithium-Ion Battery Production Method

The lithium-ion battery 100 can be produced by adopting a known method. For example, the method for producing the lithium-ion battery 100 includes laminating the positive electrode 10, the electrolyte layer 20, and the negative electrode 30 described above. A specific example of the method for producing the lithium-ion battery 100 is shown below. However, the method for producing the lithium-ion battery 100 is not limited to the method described below, and each layer may be formed by, for example, dry molding.

(1) The positive electrode active material constituting the positive electrode active material layer is dispersed in a solvent to obtain a slurry for the positive electrode layer. The solvent used in this case is not particularly limited, and water and various organic solvents can be used, and N-methylpyrrolidone (NMP) may be used. The slurry is applied to the surface of a positive electrode current collector using a doctor blade and then dried to form a positive electrode active material layer on the surface of the positive electrode current collector, thereby obtaining a positive electrode.

(2) The negative electrode active material constituting the negative electrode active material layer is dispersed in a solvent to obtain a slurry for the negative electrode layer. The solvent used in this case is not particularly limited, and water and various organic solvents can be used, and N-methylpyrrolidone (NMP) may be used. The slurry is applied to the surface of a negative electrode current collector using a doctor blade and then dried to form a negative electrode active material layer on the surface of the negative electrode current collector, thereby obtaining a negative electrode. Alternatively, a metal foil which is a negative electrode active material may be used as-is as a negative electrode.
(3) Each layer is laminated so that the negative electrode and the positive electrode interpose the electrolyte layer (solid electrolyte layer or separator), whereby a laminate having a negative electrode current collector, a negative electrode active material layer, an electrolyte layer, a positive electrode active material layer, and a positive electrode current collector in this order is obtained. Other members such as terminals are attached to the laminate as necessary.
(4) A secondary battery is formed by housing the laminate in a battery case, in the case of a liquid electrolyte battery, filling the battery case with an electrolytic solution, immersing the laminate in the electrolytic solution, and sealing the laminate in the battery case. In the case of a liquid electrolyte battery, the electrolytic solution may be included in the negative electrode active material layer, the separator, and the positive electrode active material layer in stage (3) described above.

EXAMPLES

The technology of the present disclosure will be described in further detailed below while showing the Examples, but the technology of the present disclosure is not limited to the following Examples.

1. Positive Electrode Active Material Synthesis

1.1 Examples 1 to 6

The positive electrode active material having a disordered rock salt structure was synthesized by the following method.

1.1.1 Production of Intermediate Substance $Li_2CO_3$ (excess of 3%), $TiO_2$, and $V_2O_3$ as raw materials were each weighed so as to achieve a predetermined ratio, and mixed by wet ball milling (wet BM), which is one type of wet mechanical milling. The wet BM conditions are as shown in Table 1 below. Thereafter, the mixture was pelletized. The molded pellets were placed on a boat-shaped aluminum board, wrapped with Cu foil, and fired at 900° C. for 12 hours in an Ar atmosphere to obtain the intermediate substance. By changing the composition of the raw materials, the values of x, y, and z were variously changed, and a plurality of types of intermediate substances were obtained. From the X-ray diffraction peaks and elemental analysis, it was confirmed that the plurality of types of intermediate substances all had a layered rock salt structure and had a composition represented by $Li_{1+x}Ti_yV_zO_2$ (where $0<x\leq0.20$, $0<y\leq0.40$, and $0.40\leq z\leq0.85$).

1.1.2 Dry Mechanical Milling

Positive electrode active materials were obtained by subjecting the respective intermediate substances to dry ball milling (dry BM), which is one type of dry mechanical milling. The dry BM conditions are as shown in Table 1 below. It was confirmed that the positive electrode active materials had a disordered rock salt structure belonging to space group Fm-3m, and had a composition represented by $Li_{1+x}Ti_yV_zO_2$ (where $0<x\leq0.20$, $0<y\leq0.40$, and $0.40\leq z\leq0.85$). FIG. 3 shows an example of X-ray diffraction peaks of an intermediate substance before dry mechanical milling and an example of X-ray diffraction peaks of a positive electrode active material after dry mechanical milling.

TABLE 1

|  | Container | Rotation speed | Rotation time | Rest time | Repetition no. | Set no. | Zirconia balls 10 mm | 5 mm | 1 mm |
|---|---|---|---|---|---|---|---|---|---|
| Wet BM | 45 mL | 300 rpm | 15 min | 3 min | 17 | 1 | 5 pieces | 10 pieces | 4 g |
| Dry BM | 45 mL | 600 rpm | 15 min | 3 min | 40 | 3 | 3 pieces | 10 pieces | 2 g |

1.2 Comparative Examples 1 to 3

Various positive electrode active materials ($LiNi_{1/3}Co_{1/3}Mn_{1/3}O_2$, $LiNi_{0.85}Co_{0.10}Al_{0.05}O_2$, and $LiNi_{0.5}Mn_{0.5}O_2$) having a layered rock salt structure were prepared.

1.3 Comparative Examples 4 and 5

$LiVO_2$ as a positive electrode active material which does not contain Ti was prepared. Furthermore, $Li_2TiO_3$ as a positive electrode active material which does not contain V was prepared. The specific methods for synthesizing $LiVO_2$ and $Li_2TiO_3$ conform to the method for synthesizing the Li—Ti—VO-based positive electrode active materials according to Examples 1 to 6 described above.

2. XRD Measurement and Results

2.1 Powder XRD

Figure 4:
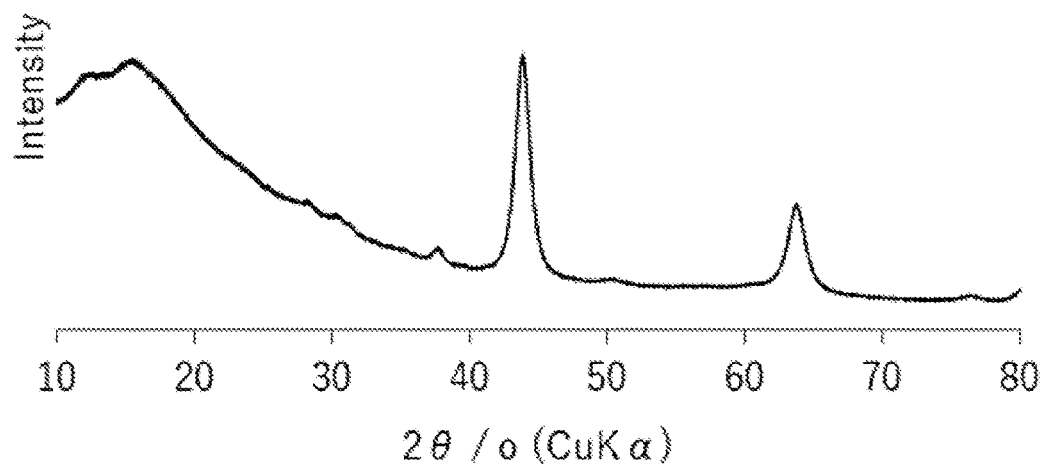
FIG. 4 shows powder X-ray diffraction peaks of a positive electrode active material according to an Example.

Powder X-ray diffraction measurement was performed on the positive electrode active materials according to the Examples. Specifically, X-ray diffraction analysis (using CuKα as a radiation source) was performed in SmartLab using a non-reflective sample plate. FIG. 4 shows the X-ray diffraction peaks of the positive electrode active material for x=0.14, y=0.29, and z=0.57.

As shown in FIG. 4, peaks which can be attributed to a disordered rock salt structure can be confirmed. All of the positive electrode active materials according to Examples 1 to 6 had a disordered rock salt structure belonging to space group Fm-3m.

2.2 Operando XRD

Changes in crystal structure during charging and discharging were observed by synchrotron radiation X-ray diffraction measurement. Table 2 below shows the maximum volume change rate along the c-axis during charging and discharging for Example 1 and Comparative Examples 1 to 3. Further, FIG. 5 shows an example of the shift change of the X-ray diffraction peaks due to charging and discharging of a positive electrode active material according to an Example.

TABLE 2

| | Composition | Maximum volume change rate (C-axis) |
|---|---|---|
| Ex 1 | $Li_{8/7}Ti_{2/7}V_{4/7}O_2$ | 0.46% |
| Comp Ex1 | $LiNi_{1/3}Co_{1/3}Mn_{1/3}O_2$ | 2.0% |
| Comp Ex2 | $LiNi_{0.85}Co_{0.10}Al_{0.05}O_2$ | 2.5% |
| Comp Ex3 | $LiNi_{0.5}Mn_{0.5}O_2$ | 1.4% |

Figure 5:
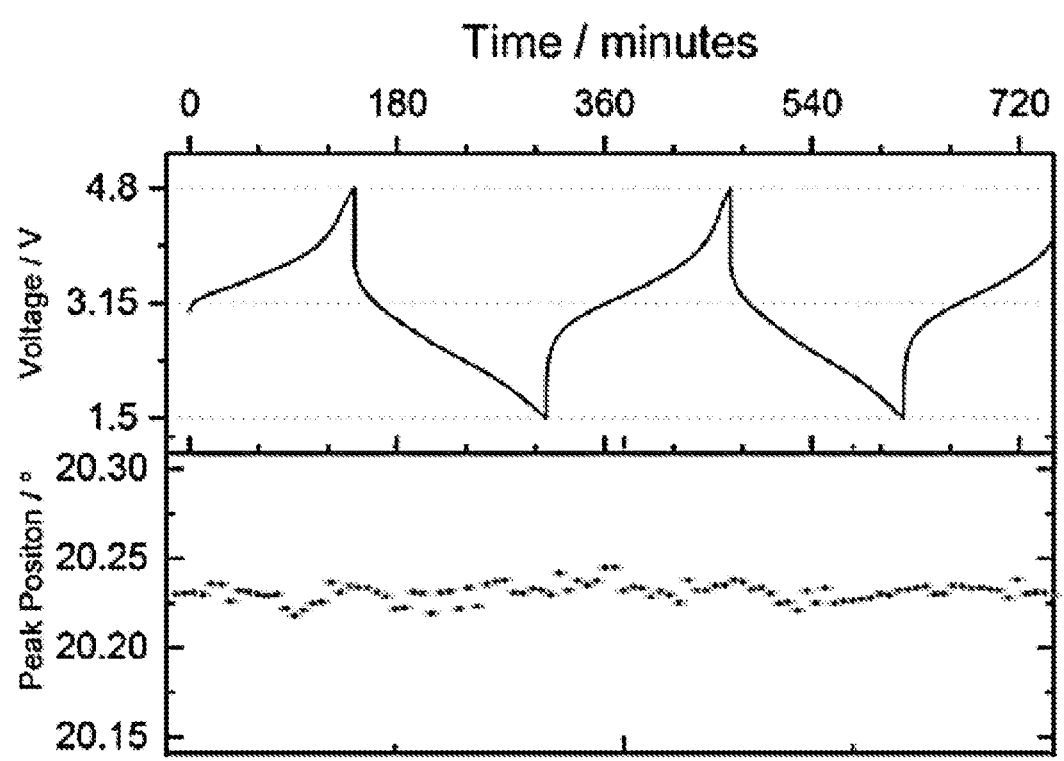
FIG. 5 shows the shift change of X-ray diffraction peaks due to charging and discharging of a positive electrode active material according to an Example.

As is clear from the results shown in Table 2 and FIG. 5, very small volume changes of less than 1% occurred in the positive electrode active material according to the Example during charging and discharging. Conversely, it was found that positive electrode active materials having a layered rock salt structure, as in Comparative Examples 1 to 3, undergo large volume changes of more than 1% during charging and discharging. From the above results, when the positive electrode active material according to an Example is applied to a lithium-ion battery, mechanical deterioration caused by volume changes of the active material during charging and discharging processes can be suppressed, whereby the cycle characteristics of the battery can easily be improved.

3. Production and Evaluation of Lithium-Ion Battery

The positive electrode active material described above, acetylene black as a conductive agent, and PVDF as a binder were weighed at a mass ratio of 76.5:13.5:10.0, mixed and dispersed in N-methylpyrrolidone to obtain a positive electrode mixture slurry. A positive electrode was obtained by applying the positive electrode mixture slurry onto an Al current collector foil and vacuum-drying at 120° C. overnight. A coin cell (CR2032) was produced using the positive electrode, a non-aqueous electrolytic solution (electrolyte: 1 M $LiPF_6$, solvent: ethylene carbonate (EC) and dimethyl carbonate (DMC) mixed at 30:70 vol %), and a metallic lithium foil as a negative electrode. The charge/discharge characteristics of the produced coin cell were evaluated in a constant temperature bath maintained at room temperature at a voltage range of 1.2 to 4.3 V and 10 mA/g. Table 3 below shows the discharge capacities of the positive electrodes of the Examples and Comparative Examples.

TABLE 3

| | Composition | Discharge capacity (mAh/g) |
|---|---|---|
| Ex 2 | $Li_{1.05}Ti_{0.10}V_{0.85}O_2$ | 211 |
| Ex 3 | $Li_{1.11}Ti_{0.22}V_{0.67}O_2$ | 245 |
| Ex 4 | $Li_{1.14}Ti_{0.29}V_{0.57}O_2$ | 270 |
| Ex 5 | $Li_{1.17}Ti_{0.33}V_{0.50}O_2$ | 213 |
| Ex 6 | $Li_{1.20}Ti_{0.40}V_{0.40}O_2$ | 181 |

TABLE 3-continued

| | Composition | Discharge capacity (mAh/g) |
|---|---|---|
| Comp Ex4 | $LiVO_2$ | 156 |
| Comp Ex5 | $Li_2TiO_3$ | 0 |

As shown in FIG. 3, it can be understood that as compared to the positive electrode active materials represented by $LiVO_2$ and $Li_2TiO_3$, the positive electrode active materials having a disordered rock salt structure and a composition represented by $Li_{1+x}Ti_yV_zO_2$ could ensure sufficient discharge capacity when applied to the positive electrode of a lithium-ion battery.

As described above, positive electrode active materials which satisfy the following requirements (1) and (2) have small volume changes during charging and discharging, and can improve the cycle characteristics of a lithium-ion battery when used, for example, in a wide SOC range with a reversible capacity of 250 mAh/g or more. Furthermore, a positive electrode having a sufficient discharge capacity can be obtained.

(1) Having a disordered rock salt structure belonging to space group Fm-3m. (2) Having a composition represented by $Li_{1+x}Ti_yV_zO_2$ (where $0<x\le0.20$, $0<y\le0.40$, and $0.40\le x\le0.85$).

REFERENCE SIGNS LIST

10 positive electrode
11 positive electrode active material layer
12 positive electrode current collector
20 electrolyte layer
30 negative electrode
31 negative electrode active material layer
32 negative electrode current collector
100 lithium-ion battery

The invention claimed is:

1. A method for the production of a positive electrode active material for a lithium-ion battery, the method comprising the steps of:
   producing an intermediate substance having a layered rock salt structure and having a composition represented by $Li_{1+x}Ti_yV_zO_2$ (where $0<x\le0.20$, $0<y\le0.40$, and $0.40\le z\le0.85$), and
   subjecting the intermediate substance to dry mechanical milling to obtain a positive electrode active material having a disordered rock salt structure belonging to space group Fm-3m, and having a composition represented by $Li_{1+x}Ti_yV_zO_2$ (where $0<x\le0.20$, $0<y\le0.40$, and $0.40\le z\le0.85$),
   wherein the dry mechanical milling is performed by a planetary ball mill,
   the rotation speed of the planetary ball mill is 500 to 700 rpm, the rotation time is 10 to 20 minutes, and the rest time is 1 to 5 minutes, and
   the rotation and the rest are repeated multiple times.

\* \* \* \* \*